United States Patent
Shinohara et al.

(10) Patent No.: US 9,994,096 B2
(45) Date of Patent: Jun. 12, 2018

(54) SEAL STRUCTURE OF AUTOMOTIVE VEHICLE WITH STORING-TYPE ROOF

(71) Applicants: MAZDA MOTOR CORPORATION, Hiroshima (JP); NISHIKAWA RUBBER CO., LTD, Hiroshima-shi (JP)

(72) Inventors: Miwa Shinohara, Hatsukaichi (JP); Keiichiro Nishiura, Hatsukaichi (JP); Hiromu Oda, Hiroshima (JP); Akio Okayama, Hiroshima (JP)

(73) Assignees: MAZDA MOTOR CORPORATION, Hiroshima (JP); NISHIKAWA RUBBER CO., LTD, Hirsohima-shi (JP)

( * ) Notice: Subject to any disclaimer, the term of this patent is extended or adjusted under 35 U.S.C. 154(b) by 0 days. days.

(21) Appl. No.: 15/459,355

(22) Filed: Mar. 15, 2017

(65) Prior Publication Data
US 2017/0267087 A1    Sep. 21, 2017

(30) Foreign Application Priority Data
Mar. 18, 2016  (JP) .................. 2016-054766

(51) Int. Cl.
  *B60J 10/90*  (2016.01)
  *B60J 7/08*   (2006.01)
(52) U.S. Cl.
  CPC  *B60J 10/90* (2016.02); *B60J 7/08* (2013.01)

(58) Field of Classification Search
  CPC ..................................... B60J 10/90; B60J 7/08
  USPC ............................................ 296/208, 107.04
  See application file for complete search history.

(56) References Cited

U.S. PATENT DOCUMENTS

| | | | |
|---|---|---|---|
| 2012/0025561 A1* | 2/2012 | Herz ........................ | B60J 10/90 296/107.04 |
| 2014/0075848 A1* | 3/2014 | Masumoto ............. | B60J 10/046 49/495.1 |
| 2016/0339770 A1* | 11/2016 | Fujimura ............... | B60J 10/248 |

FOREIGN PATENT DOCUMENTS

JP      2010-089694 A      4/2010

* cited by examiner

*Primary Examiner* — Joseph D. Pape
(74) *Attorney, Agent, or Firm* — Studebaker & Brackett PC

(57) ABSTRACT

There are provided a front weather strip provided between a first roof member and a second roof member, a rear weather strip provided between the second roof member and a third roof member, a roof-side weather strip provided at the second roof member, and a vertical weather strip. Plural partition walls which form the plural vertical flow passages are provided at the vertical weather strip, and a first flow passage for distributing water from the front weather strip to plural vertical flow passages of the vertical weather strip by way of the roof-side weather strip and a second flow passage for distributing water from the rear weather strip to at least one of plural vertical flow passages of the vertical weather strip are provided.

12 Claims, 11 Drawing Sheets

SEAL STRUCTURE OF AUTOMOTIVE VEHICLE WITH STORING-TYPE ROOF

BACKGROUND OF THE INVENTION

The present invention relates to a seal structure of an automotive vehicle with a storing-type roof which comprises openable plural roof members of a first roof member, a second roof member, and a third roof member.

In general, the storing-type roof comprises the openable plural roof members of the first roof member, the second roof member, and the third roof member, and is configured to have a roof fully-closed position in which an upper side of a cabin is covered with these roof members and a stored position (a roof fully-open position) in which the first and second roof members are stored in a storing space provided behind a seat. In the above-described roof structure, respective gaps are formed between the first roof member and the second roof member and between the second roof member and the third roof member.

Herein, a seal structure to seal the above-described respective gaps, in which a front weather strip is provided between the first roof member and the second roof member, a rear weather strip is provided between the second roof member and the third roof member, a roof-side weather strip is provided at an end portion, in a vehicle width direction, of the second roof member, and a vertical weather strip to drain water from the roof side weather strip to a vehicle outside below a floor, may be considered.

In a case where the plural weather strips are provided as described above, however, if the strength of the water flowing in from a specified portion is strong like the high-speed washing, the water reversely flows toward the other portion so that the water does not flow smoothly. Consequently, there is a problem that if the water overflows from the weather strips, some watermark may be created.

Meanwhile, Japanese Patent Laid-Open Publication No. 2010-089694 discloses a structure of an automotive vehicle which comprises a front roof, a center roof, and a rear roof, in which a pillar weather strip extending in a vehicle vertical direction is provided at a specified position corresponding to a front end of the center roof, and a water-drain hole extending in the vertical direction is provided inside the pillar weather strip, wherein water is drained through the inside of the pillar weather strip. However, there is still room for improvement in the formability or the rectification (flow straightening) properties.

SUMMARY OF THE INVENTION

Accordingly, an object of the present invention is to provide the seal structure of the automotive vehicle with the storing-type roof which can make the water coming in through the plural gaps flow smoothly, without interfering.

The present invention is a seal structure of an automotive vehicle with a storing-type roof which comprises openable plural roof members of a first roof member, a second roof member, and a third roof member, comprising a front weather strip provided between the first roof member and the second roof member, a rear weather strip provided between the second roof member and the third roof member, a roof-side weather strip provided at the second roof member, and a vertical weather strip, wherein plural partition walls which form plural vertical flow passages are provided at the vertical weather strip, and a first flow passage for distributing water from the front weather strip to the plural vertical flow passages of the vertical weather strip by way of the roof-side weather strip and a second flow passage for distributing water from the rear weather strip to at least one of the plural vertical flow passages of the vertical weather strip are provided.

According to the above-described structure, since the water flowing through the first flow passage is distributed to the plural vertical flow passages of the vertical weather strip and the water flowing through the second flow passage is distributed to at least one of the plural vertical flow passages of the vertical weather strip, the water coming in through the plural gaps can be made to flow smoothly, without interfering.

In an embodiment of the present invention, a third flow passage for draining water coming in a space between the roof-side weather strip and a side door is provided at the roof-side weather strip.

According to this embodiment, the water coming into the space between the roof-side weather strip and the side door can be drained smoothly by way of the third flow passage.

In another embodiment of the present invention, the vertical weather strip is supported at a vehicle-body side pillar portion, and a vertical rib which forms a flow passage by contacting a rear-side openable member is provided at the vertical weather strip at a specified position between a seal portion of the vertical weather strip which contacts the rear-side openable member and another seal portion of the vertical weather strip which contacts a side door. The above-described rear openable member can be the above-described third roof member which is configured to be a deck cover.

According to this embodiment, since the vertical rib forming the flow passage by contacting the rear openable member is provided at the specified position between the two seal portions, the flow passage can be created additionally by simply providing the vertical rib, so that the productivity of the vertical weather strip can be secured.

In another embodiment of the present invention, the roof-side weather strip is provided to engage with an upper-end recess portion provided at the vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by the other member.

According to this embodiment, since the roof-side weather strip engages with the upper-end recess portion provided at the vertical weather strip in the wedge shape, the liquid-tightness of the first flow passage can be secured in particular. Further, since the lip configured to be pressed against the outer surface of the vertical weather strip by the other member is provided at the above-described engagement-joining point, the sealing of the engagement-joining point can be improved.

Other features, aspects, and advantages of the present invention will become apparent from the following description which refers to the accompanying drawings.

BRIEF DESCRIPTION OF THE DRAWINGS

FIG. 10A being a sectional view taken along line A-A of FIG. 2; FIG. 10B being a sectional view taken along line B-B of FIG. 2; FIG. 10C being a sectional view taken along line C-C of FIG. 2; and FIG. 10D being a sectional view taken along line D-D of FIG. 2.

FIG. 11A being a sectional view taken along line E-E of FIG. 2; FIG. 11B being a sectional view taken along line O-O of FIG. 2; FIG. 11C being a sectional view taken along line P-P of FIG. 2; and FIG. 11D being a sectional view taken along line Q-Q of FIG. 2.

DETAILED DESCRIPTION OF THE INVENTION

Figure 1:
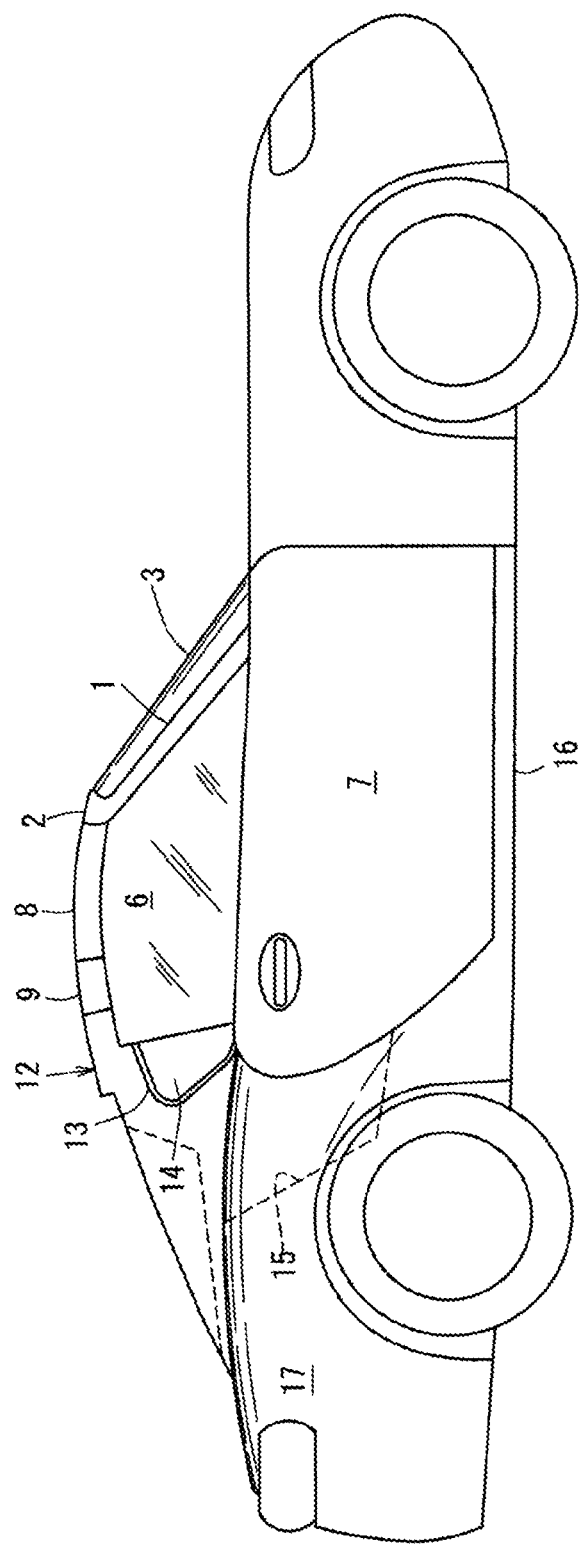
FIG. 1 is a side view of external appearance of an automotive vehicle with a storing-type roof which is provided with a seal structure of the present invention.
Figure 2:
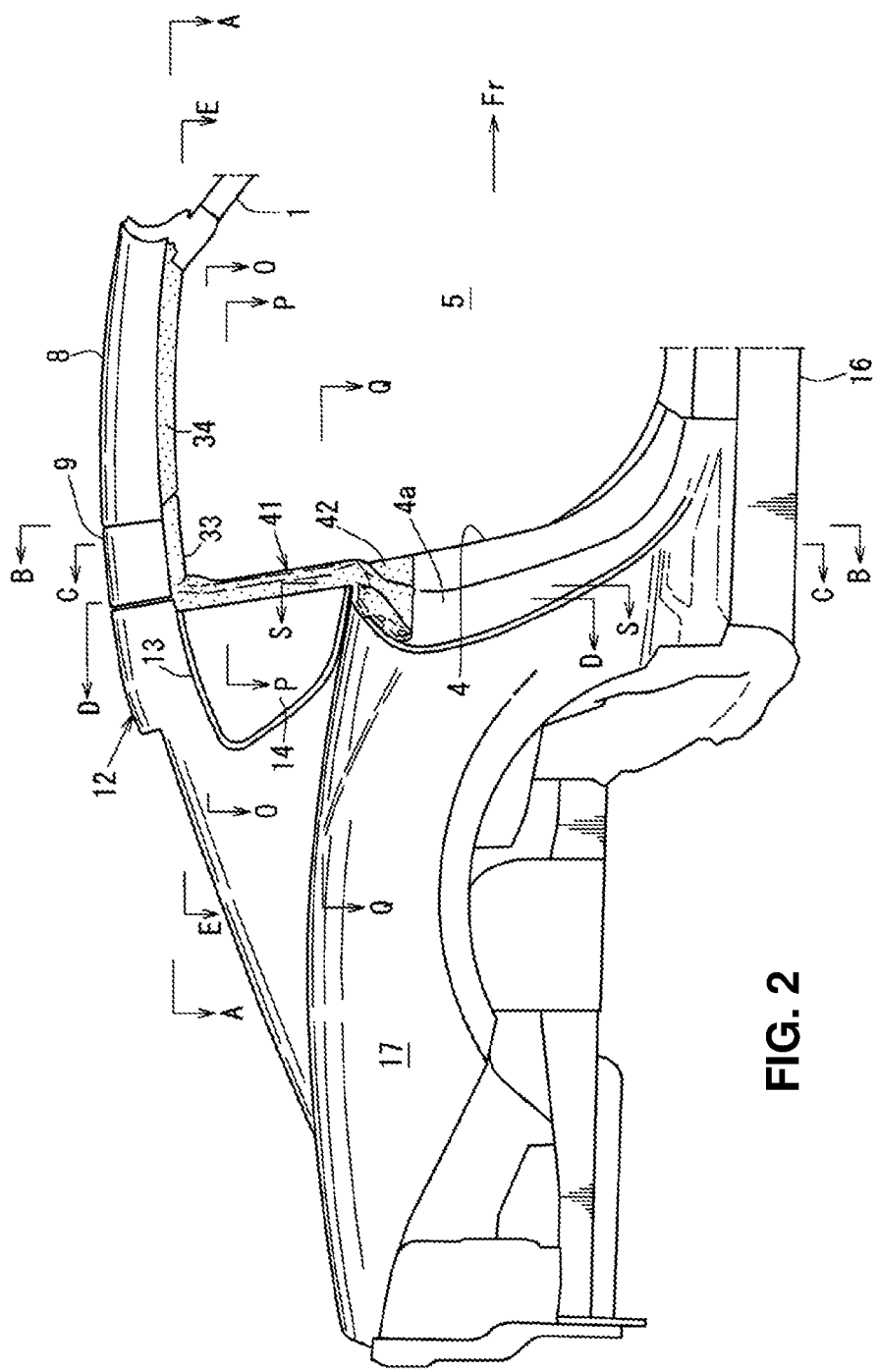
FIG. 2 is an enlarged side view of a major part of FIG. 1.

An embodiment of the present invention will be described specifically referring to the drawings. The drawings show a seal structure of an automotive vehicle with a storing-type roof, and FIG. 1 is a side view of external appearance of the automotive vehicle with the storing-type roof which is provided with the present seal structure and FIG. 2 is an enlarged side view of a major part of FIG. 1. Herein, since the seal structure and the vehicle-body structure of the present embodiment are respectively symmetrical or substantially symmetrical, the drawings show respective right-side structures only.

In FIGS. 1 and 2, a pair of right-and-left front pillars 1, 1 are provided, and a front header 2 which interconnect respective upper ends of the pair of right-and-left front pillars 1, 1 is provided. Further, a front window (windshield) glass 3 is attached to a portion enclosed by the pair of right-and-left front pillars 1, 1 and the front header 2.

A cabin 5 is provided in back of the front pillar 1 and a hinge pillar, not illustrated, such that the cabin 5 is continuous to a door opening portion for passenger's ingress/egress 4, and this door opening portion 4 is configured to be opened or closed by a side door 7 including a door window glass 6.

Further, an upper side of the above-described cabin 5 is configured to be opened or closed by a front roof 8, a rear roof 9, a glass unit 11 including a rear window glass 10 (see FIG. 3), and a deck cover 12 having an opening of the glass unit 11.

A quarter-window arrangement portion 13 is provided at a side portion of the above-described deck cover 12, and a quarter window panel 14 is integrally attached to an outward side, in a vehicle width direction, of the quarter-window arrangement portion 13. Further, a roof storing portion 15 where the font roof 8, the rear roof 9, and the glass unit 11 are stored is formed at a vehicle-body inner portion which is positioned right behind a driver's seat and a passenger seat (not illustrated) which are arranged in the cabin 5. In FIGS. 1 and 2, reference character 16 denotes a side sill, and reference character 17 denotes a rear fender.

Figure 3:
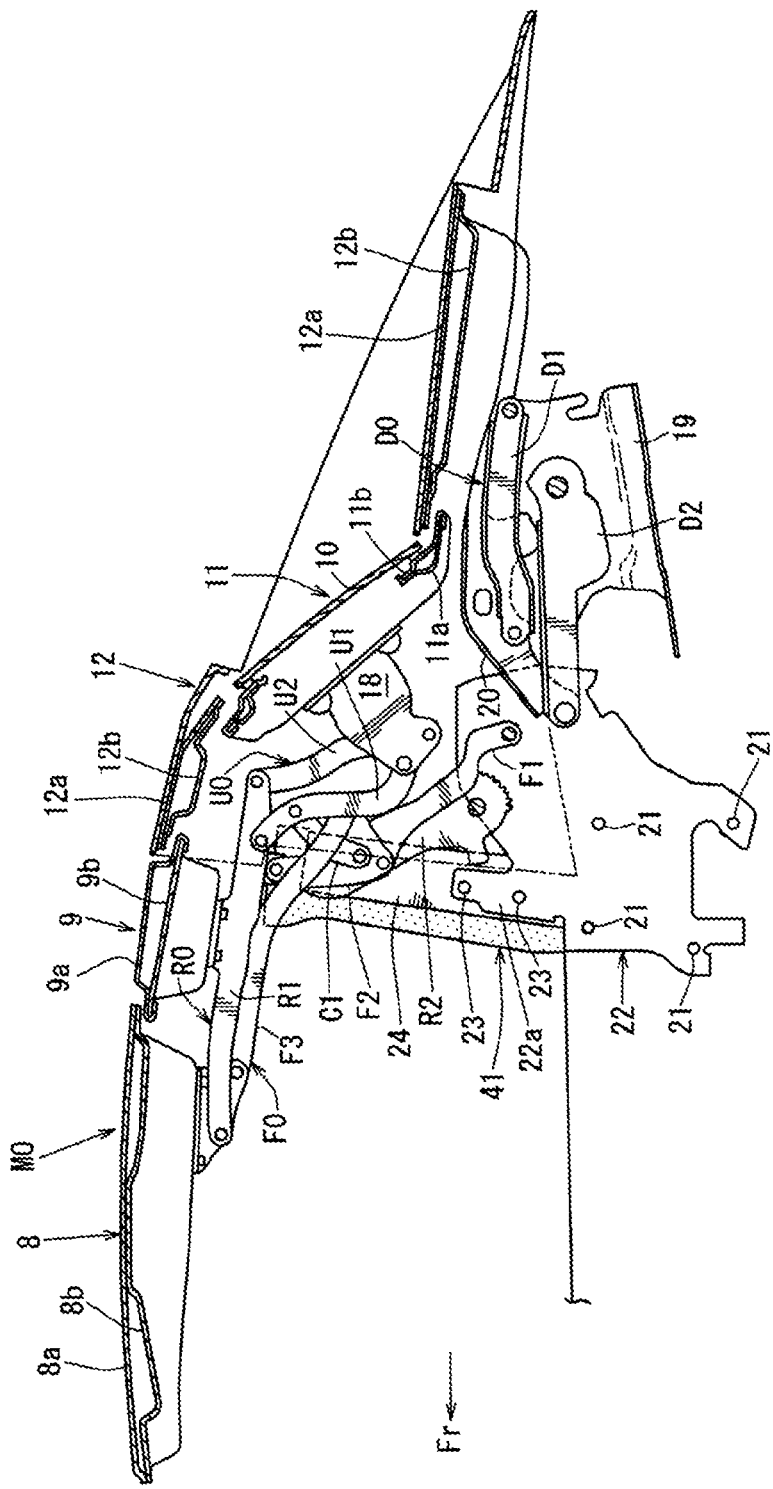
FIG. 3 is a side view showing a link support structure of a storing-type roof.

FIG. 3 is a side view showing a link support structure of the storing-type roof. The above-described front roof 8 comprises a roof outer panel 8a and a roof inner panel 8b, and the rear roof 9 comprises a roof outer panel 9a and a roof inner panel 9b. Likewise, the glass unit 11 comprises a front panel 11a and a rear panel 11b, and the deck cover 12 comprises an outer panel 12a and an inner panel 12b.

Further, the above-described front roof 8 is openably supported by a front-roof support link mechanism FO which comprises respective links F1, F2, F3, the above-described rear roof 9 is openably supported by a rear-roof support link mechanism RO which comprises respective links R1, R2 which are integrally connected in a roughly T shape in a side view, the glass unit 11 is openably supported by a glass-unit support link mechanism UO which comprises respective links U1, U2 and a bracket 18, and the deck cover 12 is openably supported by a deck-cover support link mechanism DO which comprises a pair of links D1, D2, a fixing bracket 19 fixed to a vehicle-body side, and a movable bracket 20 fixed to a lower portion of the inner panel 12b. Moreover, the link F2 of the front-roof support link mechanism FO and the link U1 of the glass-unit support link mechanism UO are connected to each other by a connecting link C1.

Further, as shown in FIG. 3, a base bracket 22 is attached to a vehicle-body side wall by using plural attaching members 21 . . . , and a pillar 24 as a vehicle-body side pillar portion is attached to a front upper portion 22a of the base bracket 22 by using plural attaching members 23, 23. The pillar 24 is attached to the vehicle-body side separately from the roof (see the front roof 8, the rear roof 9, the glass unit 11, and the deck cover 12).

Herein, a storing roof module MO is constituted by the front roof 8, the rear roof 9, the glass unit 11, the link RO, and the link mechanisms FO, UO, and the above-described pillar 24 is attached to the base bracket 22 which is the vehicle-body attaching member of the storing roof module MO.

Figure 4:
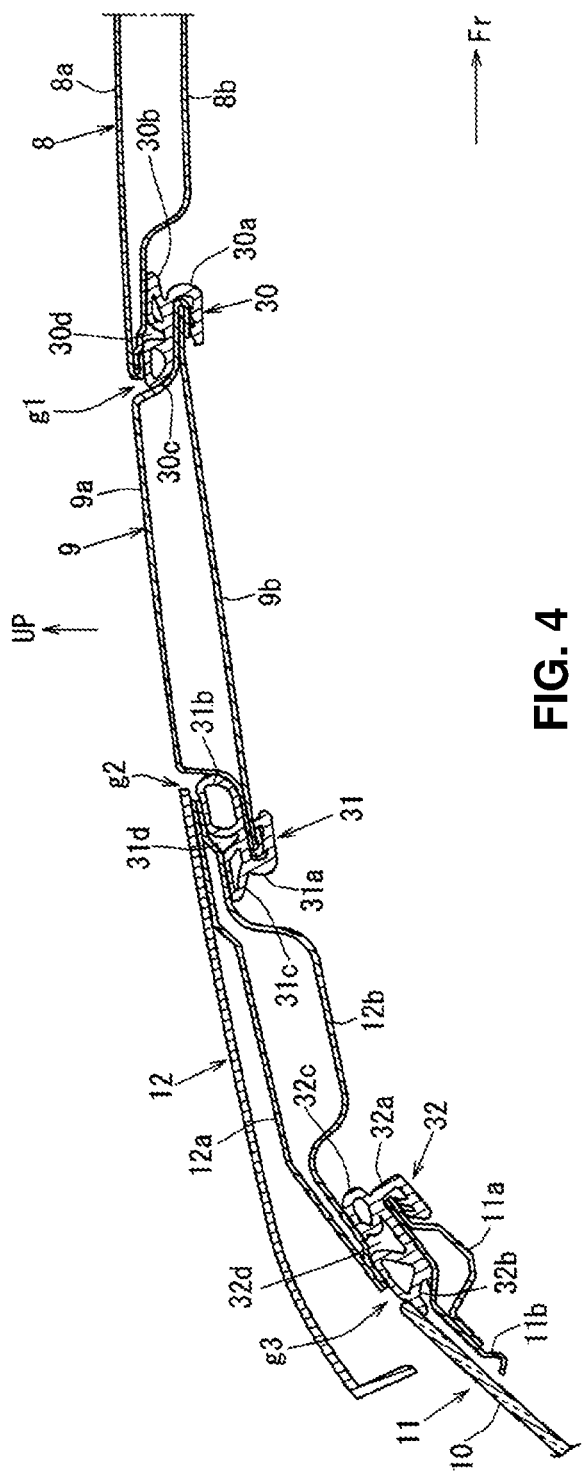
FIG. 4 is a side view showing a seal structure of plural roof members.

FIG. 4 is a side view showing the seal structure of plural roof members.

As shown in FIG. 4, a gap g1 is formed between a rear end of the front roof 8 as the first roof member and a front end of the rear roof 9 as the second roof member. A gap g2 is formed between a rear end of the rear roof 9 as the second roof member and the deck cover 12 as the third roof member. A gap g3 is formed between the deck cover 12 and the glass unit 11. The above-described gap g1 is sealed by a front roof weather strip 30, the above-described gap g2 is sealed by a rear roof weather strip 31, and the above-described gap g3 is sealed by a ring-shaped weather strip 32 (see FIG. 6).

As shown in FIG. 4, the front weather strip 30 comprises a base portion 30a which interposes a panel joint portion of the rear roof 9 and front-and-rear seal portions 30b, 30c which are formed in a hollow shape, respectively, which are formed integrally. A recess groove 30d is formed between the roof seal portions 30b, 30c. Likewise, the rear weather strip 31 comprises a base portion 31a which interposes the panel joint portion of the rear roof 9 and front and rear seal portions 31b, 31c which are formed in a hollow shape, respectively, which are formed integrally. A recess groove 31d is formed between the roof seal portions 31b, 31c.

The ring-shaped weather strip 32 comprises a base portion 32a which interposes a panel joint portion of the glass unit 11 and inner-and-outer peripheral seal portions 32b, 32c which are formed in a hollow shape, respectively, which are formed integrally. A recess groove 32d is formed between the inner-and-outer peripheral seal portions 32b, 32c.

Figure 5:
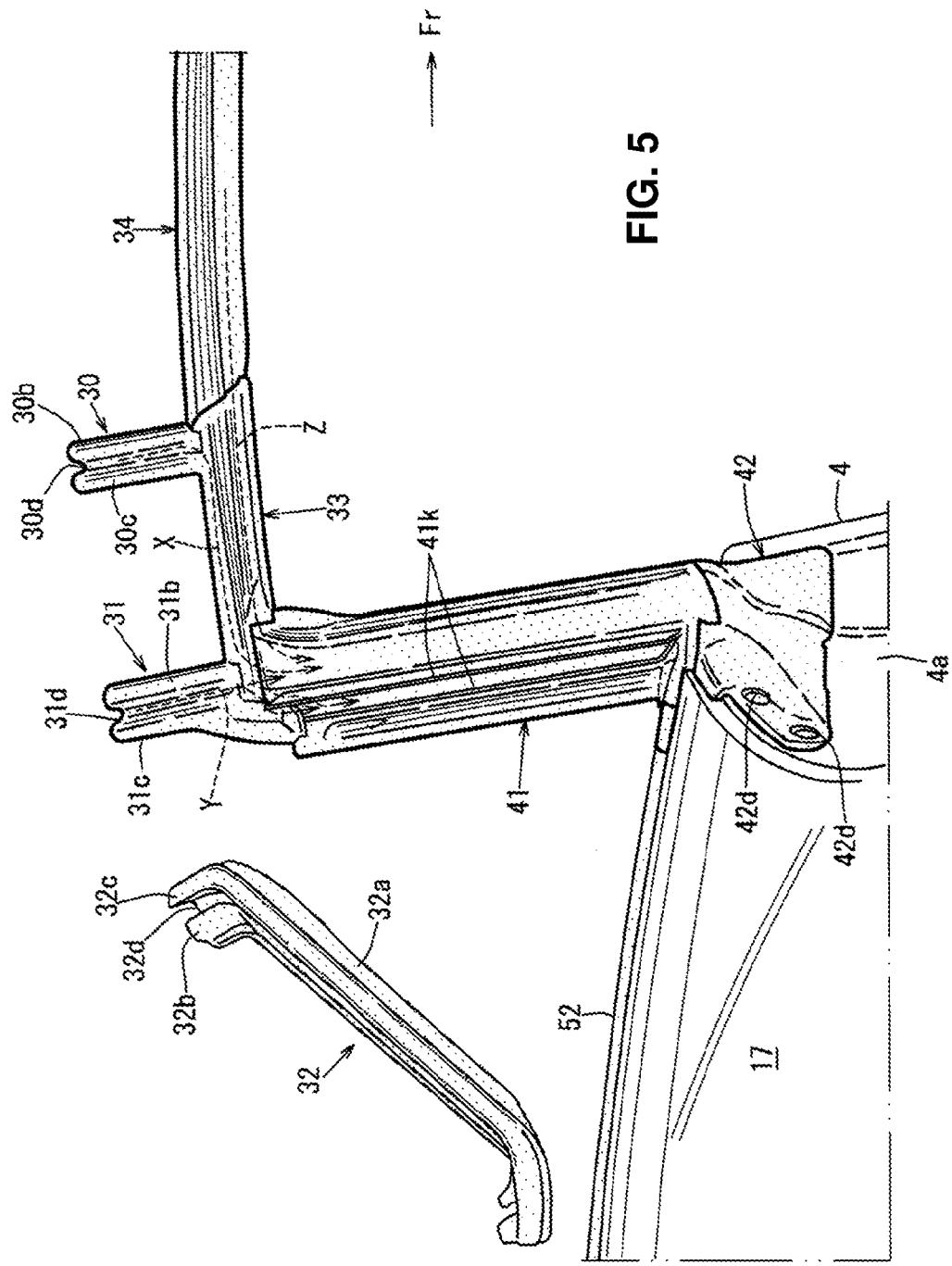
FIG. 5 is a side view showing a seal structure of the automotive vehicle.
Figure 6:
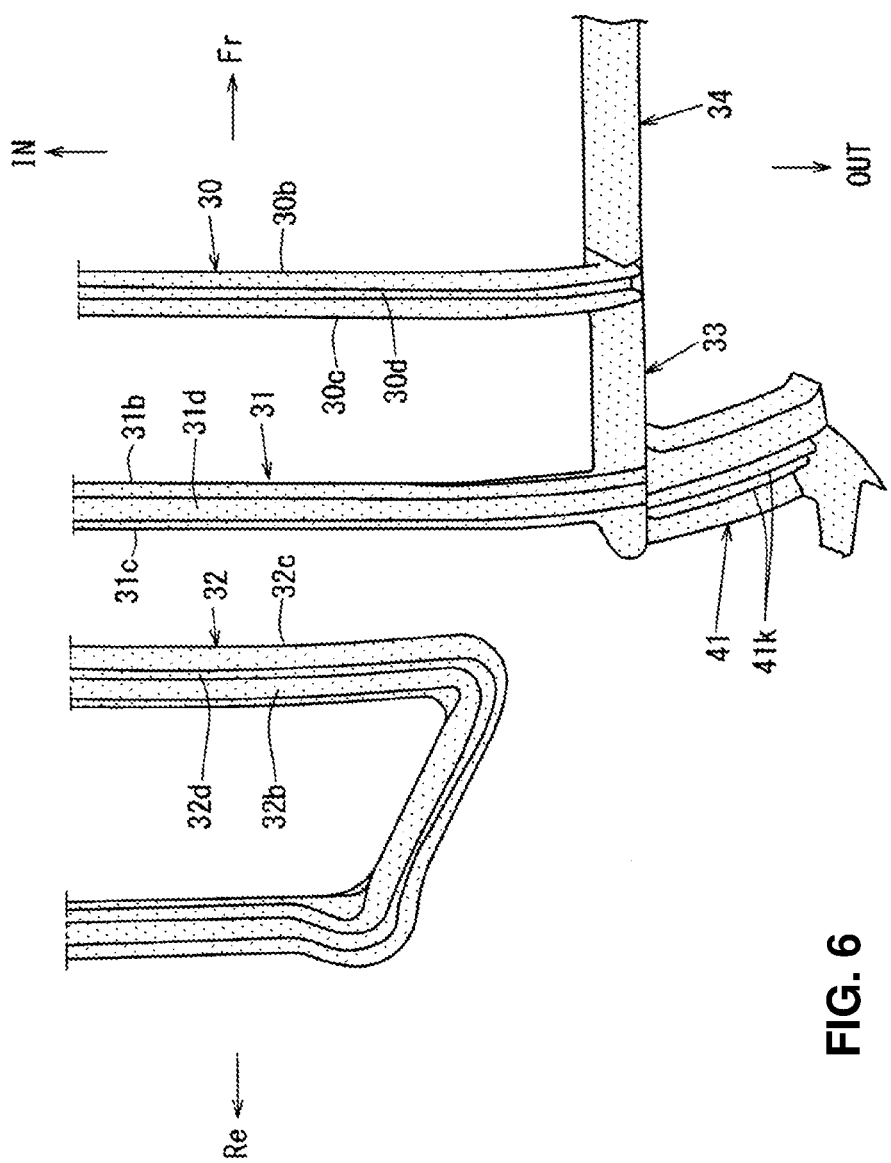
FIG. 6 is a plan view showing the seal structure which is extracted only.

FIG. 5 is a side view showing the seal structure of the automotive vehicle, and FIG. 6 is a plan view showing the seal structure which is extracted only.

As shown in FIGS. 4-6, the front weather strip 30 extends in the vehicle width direction, corresponding to the gap g1 between the front roof 8 and the rear roof 9. Likewise, the rear weather strip 31 extends in the vehicle width direction, corresponding to the gap g2 between the rear roof 9 and the deck cover 12. The ring-shaped weather strip 32 is formed in a loop shape, corresponding to the ring-shaped gap g3 between the deck cover 12 and the glass unit 11.

As shown in FIGS. 5 and 6, a roof-side weather strip 33 is provided at a roof side portion of the rear roof 9 as the second roof member. In the present embodiment, the roof-side weather strip 33 is integrally formed with the front weather strip 30 and the rear weather strip 31.

Meanwhile, as shown in FIGS. 5 and 6, a roof-side weather strip 34 is provided at a roof side portion of the front roof 8 as the first roof member. The roof-side weather strip 34 positioned on the side of the front roof 8 and the roof-side weather strip 33 positioned on the side of the rear roof 9 are configured to be continuous in a vehicle longitudinal direction when the roofs are fully closed.

Figure 7:
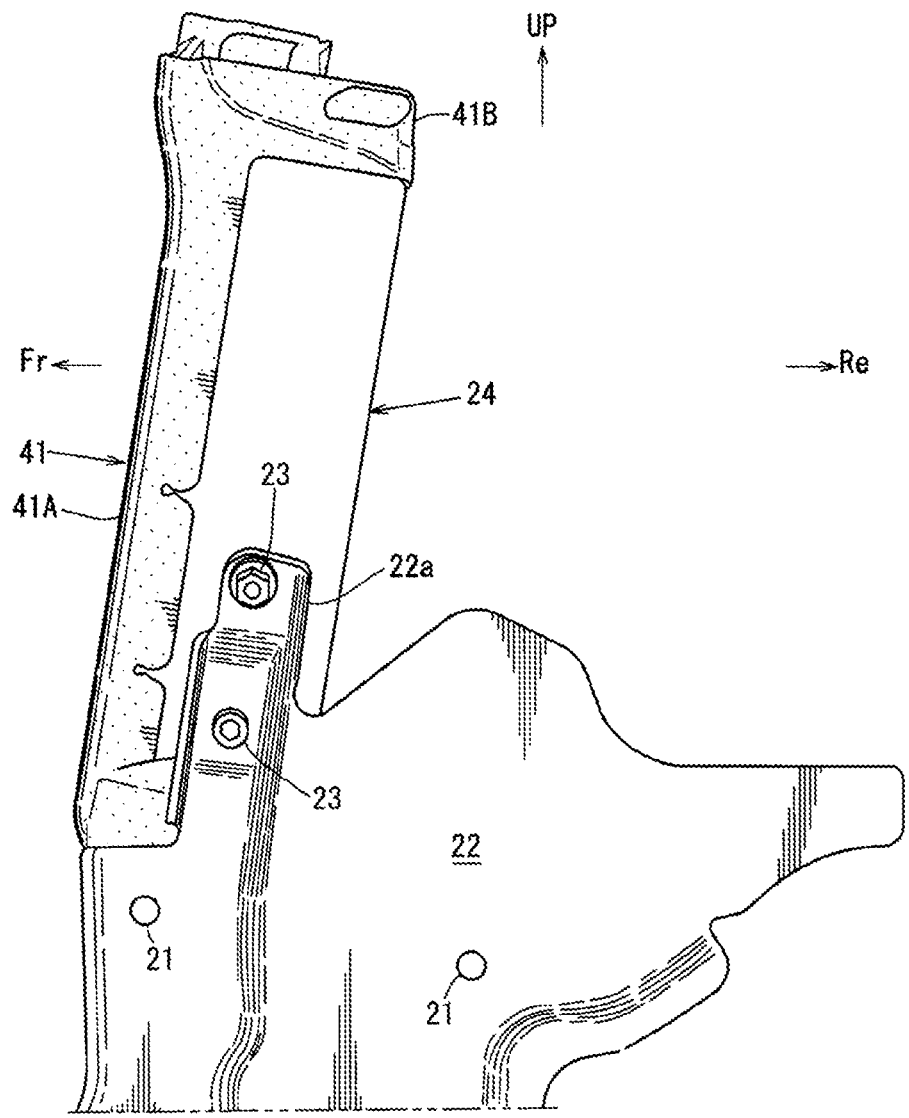
FIG. 7 is an enlarged view of a major part of FIG. 3, which shows an attachment structure of a pillar.
Figure 8:
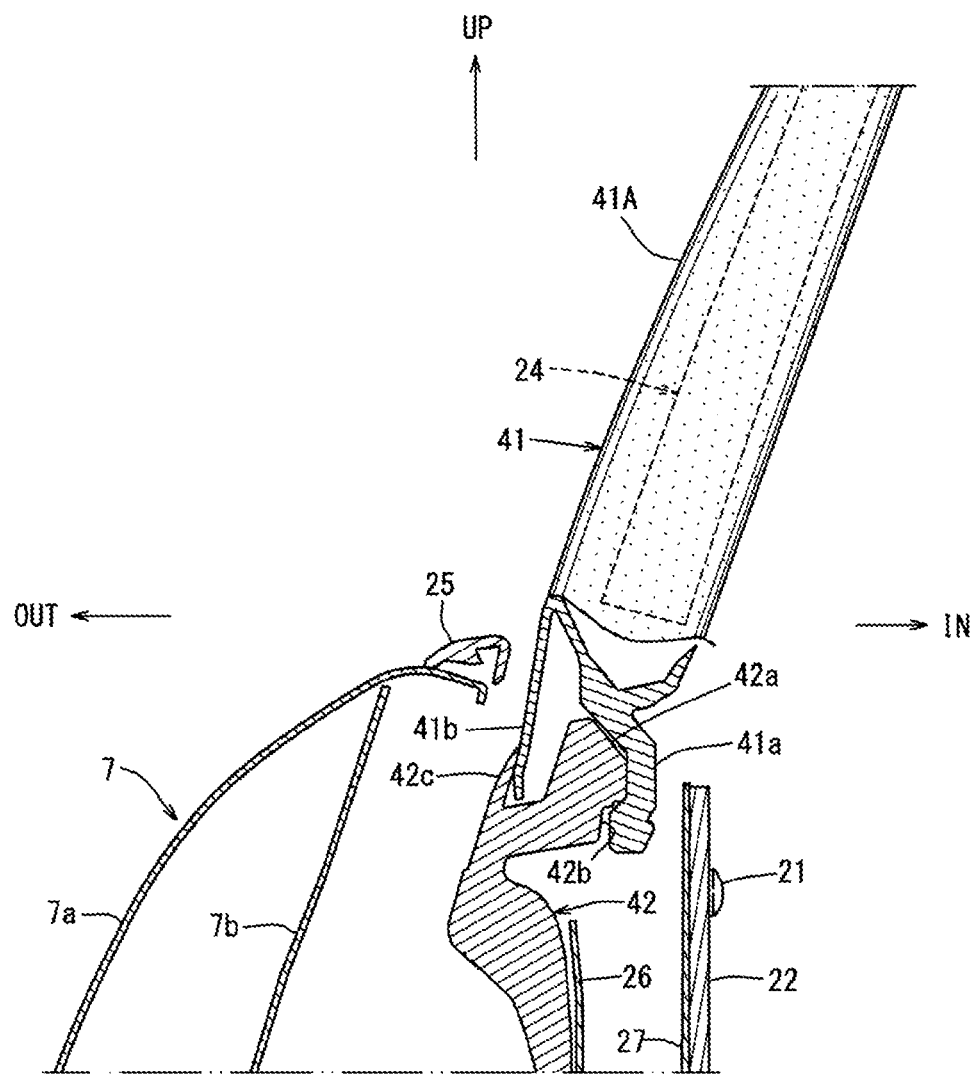
FIG. 8 is a sectional view taken along line S-S of FIG. 2.

FIG. 7 is an enlarged view of a major part of FIG. 3, which shows an attachment structure of the pillar 24, and FIG. 8 is a sectional view taken along line S-S of FIG. 2. As shown in FIGS. 2 and 5-8, a pillar-side weather strip 41 as a vertical weather strip is provided at the pillar 24, and a vehicle-body side weather strip 42 is attached to a portion of a door-opening portion rear-side forming member 4a which is located right below a beltline as shown in FIG. 5. Herein, the door-opening portion rear-side forming member 4a is positioned on the vehicle-body side of a lower portion of the pillar 24.

As shown in FIG. 7, the pillar-side weather strip 41 comprises a vertical-direction middle portion 41A and an upper portion 41B. The upper portion 41B is configured such that the upper portion 41B covers over the pillar 24 and a rear portion of the roof-side weather strip 33 which is the weather strip positioned on the roof side engages with the upper portion 41B from above.

Figure 9:
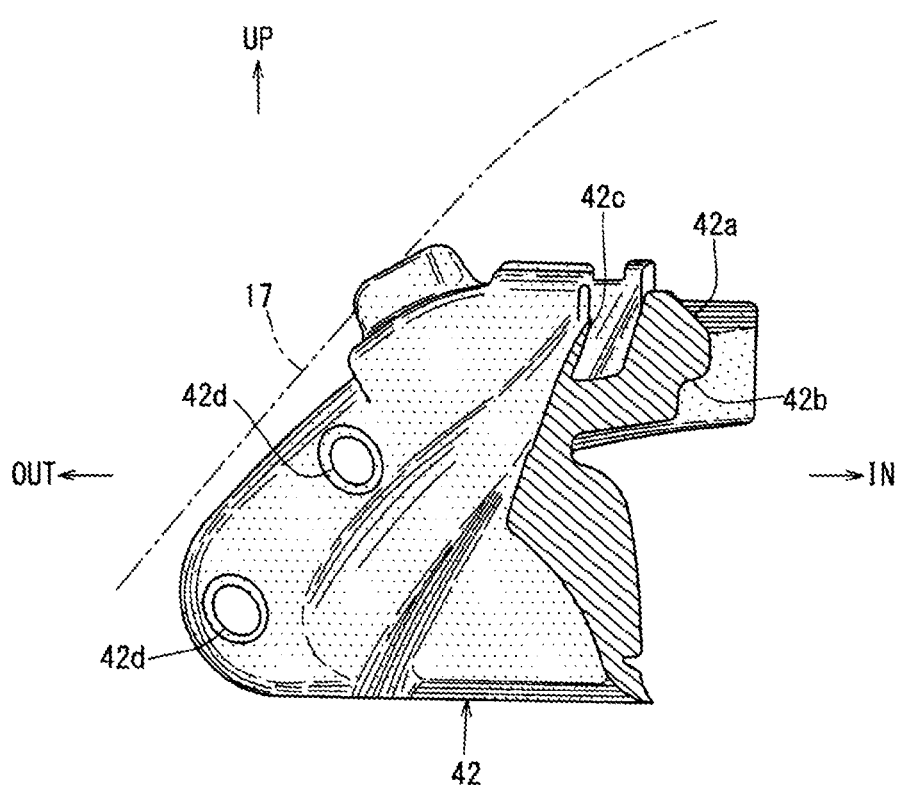
FIG. 9 is a front view of a vehicle-body side weather strip, which shows a cross section of part thereof.

FIG. 9 is a front view of the vehicle-body side weather strip 42, which shows a cross section of part thereof. As shown in FIG. 8, the pillar-side weather strip 41 has an engagement portion 41a and a hanging piece 41b which are formed integrally at its lower end portion. The engagement portion 41a is configured such that an inward side, in the vehicle width direction, of the vehicle-body side weather strip 42 engages with the engagement portion 41a. As show in FIGS. 8 and 9, the vehicle-body side weather strip 42 comprises a slant-shaped guide portion 42a which guides the engagement portion 41a of the pillar-side weather strip 41 inward in the vehicle width direction and downward, a recess portion 42b which is positioned at a lower portion of the guide portion 42a as an engaged portion, and a wall portion 42c which contacts the hanging piece 41b of the pillar-side weather strip 41 from the outward side in the vehicle width direction.

Thus, the engagement portion 41a of the pillar-side weather strip 41 is guided by the guide portion 42a of the vehicle-body side weather strip 42 inward and downward, and then made to engage with the recess portion 42b of the vehicle-body side weather strip 42, thereby attaining positioning. And, the wall portion 42c is made to contact the hanging piece 41b provided at the lower portion of the pillar-side weather strip 41 from the outward side. Accordingly, the sealing can be secured, so that the sealing and the assembling of the pillar 24 which is different member from the roof can be compatibly secured. In particular, this is effective in assembling the storing roof module MO to the vehicle body in a hanging manner.

In FIG. 8, reference character 7a denotes a door outer panel, reference character 7b denotes a door inner panel, reference character 25 denotes a door beltline weather strip, reference character 26 denotes a pillar outer panel, and reference character 27 denotes a pillar inner panel. The pillar outer panel 26 and the pillar inner panel 27 are different members from the above-described pillar 24.

Further, as shown in FIGS. 5 and 9, the vehicle-body side weather strip 42 is provided with plural attachment holes 42d, 42d which are spaced apart from each other, and the vehicle-body side weather strip 42 is attached to the door-opening portion rear-side forming member 4a by using the attachment holes 42d, 42d.

Figure 10A:
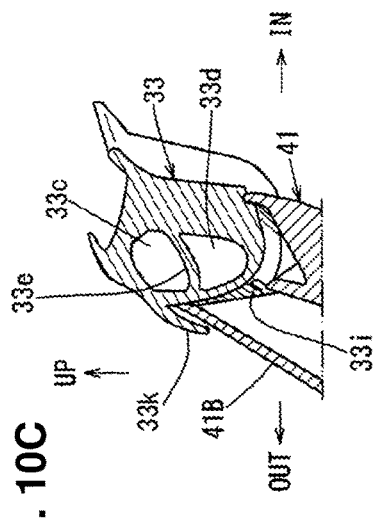
FIG. 10A-10D are sectional views.
Figure 10C:
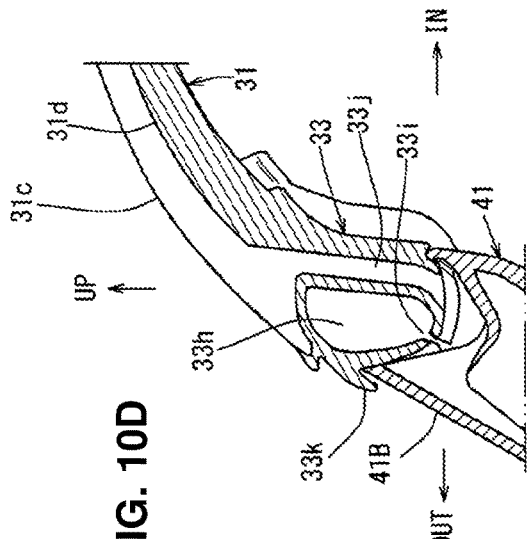
Figure 10B:
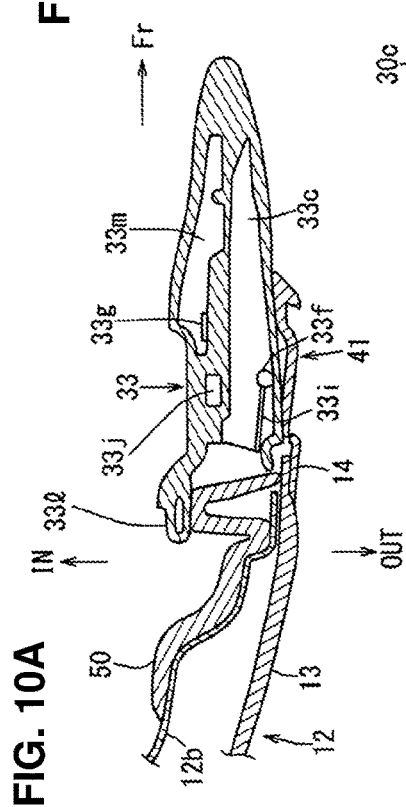
Figure 10D:
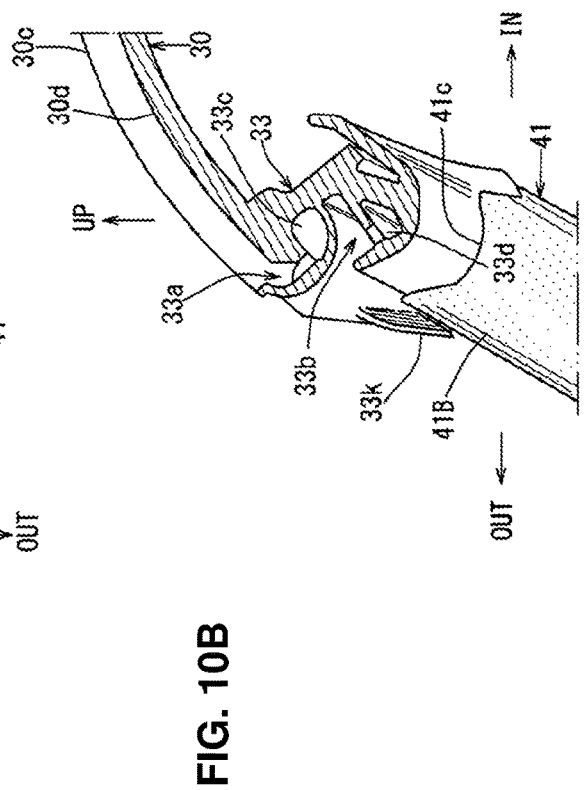

FIG. 10A is a sectional view taken along line A-A of FIG. 2, FIG. 10B is a sectional view taken along line B-B of FIG. 2, FIG. 10C is a sectional view taken along line C-C of FIG. 2, and FIG. 10D is a sectional view taken along line D-D of FIG. 2.

Figure 11A:
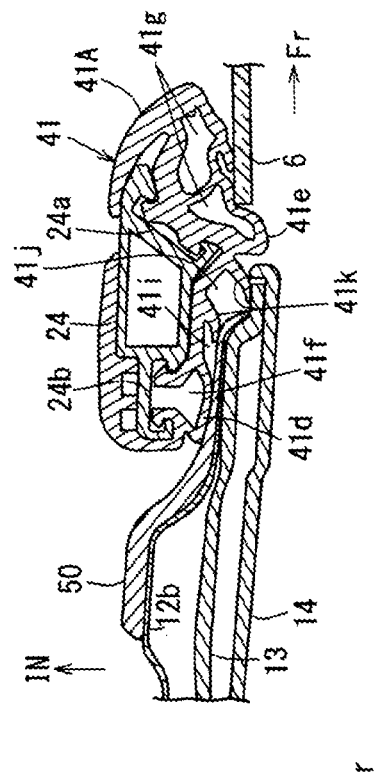
FIG. 11A-11D are sectional views.
Figure 11C:
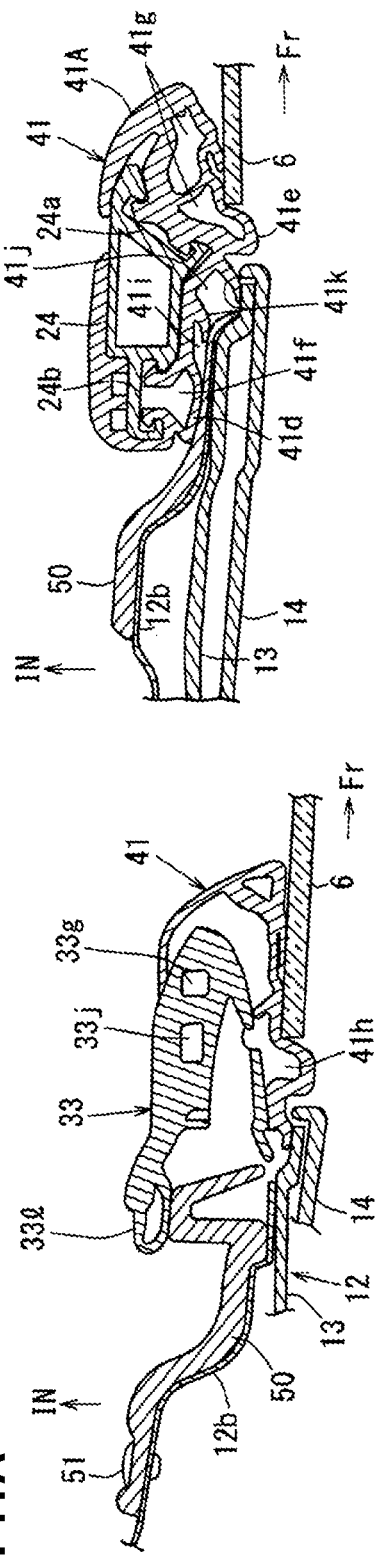
Figure 11B:
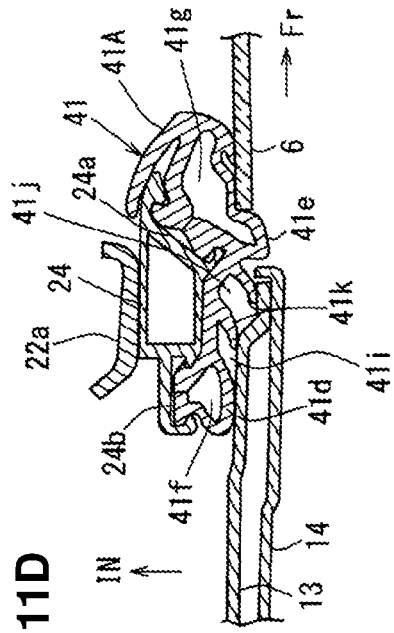
Figure 11D:
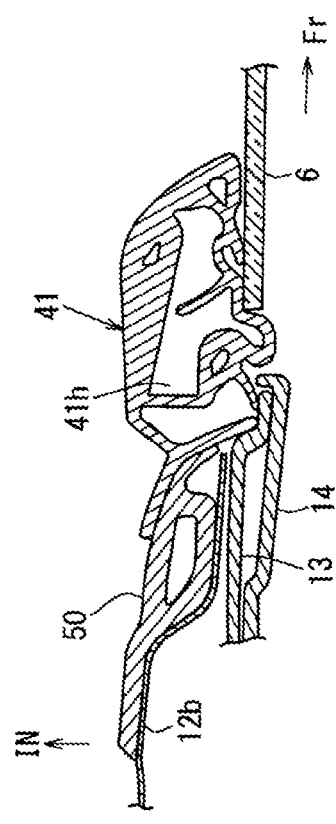

FIG. 11A is a sectional view taken along line E-E of FIG. 2, FIG. 11B is a sectional view taken along line O-O of FIG. 2, FIG. 11C is a sectional view taken along line P-P of FIG. 2, and FIG. 11D is a sectional view taken along line Q-Q of FIG. 2. In FIGS. 10A-10D and 11A-11D, a state where the outer panel 12a of the deck cover 12 is omitted is illustrated, respectively.

Herein, FIG. 10B is a sectional view of a front portion of the roof-side weather strip 33, FIG. 10C is a sectional view of a middle portion, in the longitudinal direction, of the roof-side weather strip 33, and FIG. 10D is a sectional view of the rear portion of the roof-side weather strip 33.

In FIG. 10B, an upper recess groove 33a which extends in the vehicle longitudinal direction is provided to connect to the recess groove 30d, and a lower recess groove 33b is provided below the recess groove 33a to connect to a recess groove (not illustrated) of the roof-side weather strip 34 which is positioned on the front-roof side. Further, a hollow-shaped upper water passage 33c is formed right below the upper recess groove 33a, and a hollow-shaped lower water passage 33d is formed right below the upper recess groove 33a.

These upper-and-lower water passages 33c, 33d are configured such that the upper water passage 33c connects to a rear portion of the upper recess groove 33a, the lower passage 33d connects to a rear portion of the lower recess groove 33b, these water passages 33c, 33d are provided closely to each other at a sectional position shown in FIG. 10C which is located in back of the recess grooves 33a, 33b, and a partition portion 33e is formed between the upper-and-lower water passages 33c, 33d.

The lower water passage 33d connects to a front-side vertical flow passage 41g of the pillar-side weather strip 41, which will be described below, at a hole 33f shown in FIG. 10A, and the recess groove 33m shown in FIG. 10A receives water positioned on a lower-face side of a roof panel, such as dew drops, and connects to the lower water passage 33d and the vertical flow passage 41g at the hole 33g.

The partition portion 33e does not exist at a position of the rear portion of the roof-side weather strip 33 shown in FIG. 10D, where a hollow-shaped joining water passage 33h where the upper water passage 33c joins the lower water passage 33d is formed.

As shown in FIG. 10D, a flow hole 33i is formed at a lower portion of the joining water passage 33h. As shown in FIGS. 10A and 10B, a vertical water passage 33j is formed on the inward side, in the vehicle width direction, of the joining water passage 33*h* such that the vertical water passage 33*j* connects to the recess groove 31*d* and a lower end of the vertical water passage 33*j* opens to the vertical flow passage 41*g* which is positioned at a front side of the pillar-side weather strip 41, which will be described later. The above-described flow hole 33*i* is slender than the hole 33*f* and extends to a specified position which is located in back of the hole 33*f*, and is configured such that an effective opening area thereof changes in accordance with the flow amount. Herein, the joining flow passage 33*h* has a cutout at its rear portion as shown in FIG. 10A, and connects to vertical flow passages 41*i*, 41*j* which are positioned at a rear side of the pillar-side weather strip 41, which will be described later. An opening area of the pillar-side weather strip 41 connecting to the vertical flow passages 41*i*, 41*j* is larger than the hole 33*f* and the flow 33*i*.

As shown in FIGS. 10A, 10B and 10C, a lower portion of the roof-side weather strip 33 engages with the upper-end recess portion 41*c* of the pillar-side weather strip 41 in a wedge shape at a position where the roof-side weather strip 33 corresponds to the pillar-side weather strip 41, and a lip 33*k* having a specified longitudinal width is provided at an engagement-joining point of the roof-side weather strip 33. This lip 33*k* is provided at a specified position which is interposed between the door window glass 6 as another member and an outer surface of the pillar-side weather strip 41 such that the lip 33*k* is configured to be pressed against the outer surface of the pillar-side weather strip 41 by the door window glass 6. Thus, the door window glass 6 is configured to contact the lip 33*k* from the outward side, thereby improving the sealing of the engagement-joining point of the above-described both members 33, 41.

In FIGS. 11A-11D, FIG. 11A is a sectional view of the engagement-joining point of the roof-side weather strip 33 and the pillar-side weather strip 41, FIG. 11B is a sectional view of a portion slightly lower than the portion shown in FIG. 11A, FIG. 11C is a sectional view of a portion slightly lower than the portion shown in FIG. 11B which corresponds to an upper portion of the pillar 24, and FIG. 11D is a sectional view which corresponds to a lower portion of the pillar 24.

As shown in FIGS. 11C and 11D, the pillar 34 are configured to include front-and-rear weather strip engagement grooves 24*a*, 24*b* which extend in the vertical direction along the pillar 24 and have a roughly identical cross section. In the present embodiment, the pillar 24 is made of extrusion casting or roll forming article of aluminum or aluminum alloy.

As shown in FIGS. 7, 8, 11C and 11D, the vertical-direction middle portion 41A of the pillar-side weather strip 41 is configured to engage with the above-described weather strip engagement grooves 24*a*, 24*b*.

Meanwhile, as shown in FIGS. 11A-11C, a seal portion 50 positioned on the side of the deck cover 12 is attached to the inner panel 12*b* of the deck cover 12 by using a clip 51.

As shown in FIGS. 11C and 11D, the pillar-side weather strip 41 is supported at the pillar 24 as the vehicle-body side pillar portion, and the pillar-side weather strip 41 comprises a hollow-shaped seal portion 41*d* for sealing the deck cover 12 and a hollow-shaped seal portion 41*e* for sealing the door window glass 6 of the side door 7. Vertical flow passages 41*f*, 41*g* are formed inside the seal portions 41*d*, 41*g*. Herein, the seal portions 41*d*, 41*e* are plural partition walls to form the vertical flow passages 41*f*, 41*g*.

As shown in FIGS. 11A and 11B, the above-described vertical flow passages 41*f*, 41*g* joins at an upper portion of the pillar-side weather strip 41, where a joining portion 41*h* is formed.

Further, as shown in FIGS. 11C and 11D, vertical ribs 41*k*, 41*k* are provided between the above-described front-and-rear seal portions 41*d*, 41*e* so as to form flow passages 41*i*, 41*j* by contacting the seal portion 50 of the deck cover 12 or the quarter-window arrangement portion 13. While the two-row vertical ribs 41*k* which extend in the vertical direction are exemplified in the present embodiment, three or more rows of vertical ribs 41*k* may be provided.

Moreover, as shown in FIGS. 10A and 11A, a hollow-shaped seal portion 33*l* is integrally formed at an inside part, in the vehicle width direction, of a rear portion of the roof-side weather strip 33 for sealing a space between the inside part, in the vehicle width direction, of the rear portion of the roof-side weather strip 33 and an inside part, in the vehicle width direction, of a front portion of the seal portion 50 positioned on the side of the deck cover 12. The seal portion 50 positioned on the side of the deck cover 12 is pressed against an area from the roof-side weather strip 33 to an upper end portion of the pillar-side weather strip 41 as shown in FIGS. 10A-10D and 11A-11D.

As shown in FIG. 5, there are provided a first flow passage X which distributes water from the front weather strip 30 to the plural flow passages 41*i*, 41*j* and the vertical flow passage 41*g* of the pillar-side weather strip 41 as the vertical weather strip by way of the roof-side weather strip 33, a second flow passage Y which distributes water from the rear weather strip 31 to the plural vertical flow passages 41*g* of the pillar-side weather strip 41, and a third flow passage Z which is formed at the roof-side weather strip 33 and drains water coming in to a space between the roof-side weather strip 33 and the door window glass 6 of the side door 7, such as a connection portion to the roof-side weather strip 34 positioned on the side of the front roof and/or dew drops and the like positioned on a roof inner face.

Herein, the above-described first flow passage X includes the respective elements 30*d*, 33*a*, 33*f*, 33*c*, 33*h*, 33*i*, 41*h* disclosed in FIGS. 10A-10D and 11A-11D, the above-described second flow passage Y includes the respective elements 31*d*, 33*j*, 41*h*, and the above-described third flow passage Z includes a flow passage (not illustrated) which is provided at the roof-side weather strip 34 positioned on the side of front roof shown in FIG. 5 and the respective elements 33*b*, 33*g*, 33*d*, 33*h*, 33*i*, 33*m*, 41*h* disclosed in FIGS. 10A-10D and 11A-11D.

Concerning the above-described first, second, and third flow passages X, Y, Z, the water from the first flow passage X is distributed to the plural flow passages 41*i*, 41*j* and the vertical flow passage 41*g* of the pillar-side weather strip 41, and the water from the second flow passage Y is distributed to the plural vertical flow passages 41*g* of the pillar-side weather strip 41, whereby the water coming in from the plural gaps g1, g2 (see FIG. 4) is made to flow smoothly, without interfering.

In particular, the first and second flow passages X, Y are configured to independently face and connect to inlets of the plural pillar-side flow passages, so that reverse flowing is properly prevented. Also, the third flow passage Z is configured to extend forward and connect to a drain passage positioned on the side of the front pillar, not illustrated, so that the water dispersion is promoted, thereby the water reverse flowing or leakage are suppressed.

Herein, a gutter member to receive flowing-down water is provided below the vehicle-body side weather strip 42, a hose which connects to an inner bottom portion of the gutter member is provided, and this hose is configured to open outward below the wheelhouse or below the floor panel, thereby draining the flowing-down water to the vehicle outside.

In FIG. 5, reference character 52 denotes a rear-fender side weather strip. Further, in the figures, an arrow Fr shows a vehicle forward side, an arrow Re shows a vehicle rearward side, an arrow IN shows an inward side in the vehicle width direction, an arrow OUT shows an outward side in the vehicle width direction, and an arrow UP shows a vehicle upward side.

The seal structure of the automotive vehicle with the storing-type roof of the above-described embodiment comprises the openable plural roof members of the first roof member (see the front roof 8), the second roof member (see the rear roof 9), and the third roof member (see the deck cover 12), comprising the front weather strip 30 provided between the first roof member (the front roof 8) and the second roof member (the rear roof 9), the rear weather strip 31 provided between the second roof member (the rear roof 9) and the third roof member (the deck cover 12), the roof-side weather strip 33 provided at the second roof member (the rear roof 9), and the vertical weather strip (the pillar-side weather strip 41), wherein the plural partition walls (see the seal portions 41d, 41e, the vertical ribs 41k) which form the plural vertical flow passages 41i, 41j, 41g are provided at the vertical weather strip (the pillar-side weather strip 41), and the first flow passage X for distributing the water from the front weather strip 30 to the vertical flow passages 41i, 41j, 41g of the vertical weather strip (the pillar-side weather strip 41) by way of the roof-side weather strip 33 and the second flow passage Y for distributing the water from the rear weather strip 31 to the plural vertical flow passages 41g of the vertical weather strip (the pillar-side weather strip 41) are provided (see FIGS. 5 and 11A-11D).

According to the above-described structure, since the water flowing through the first flow passage X is distributed to the plural vertical flow passages 41i, 41j, 41g of the vertical weather strip (the pillar-side weather strip 41) and the water flowing through the second flow passage Y is distributed to the plural vertical flow passages 41g of the vertical weather strip (the pillar-side weather strip 41), the water coming in through the plural gaps g1, g2 (see FIG. 4) can be made to flow smoothly, without interfering.

In the embodiment of the present invention, the third flow passage Z for draining the water coming in the space between the roof-side weather strip 33 and the side door 7 (specifically, the door window glass 6 of the side door 7) is provided at the roof-side weather strip 33 (see FIGS. 1 and 5).

According to this structure, the water coming into the space between the roof-side weather strip 33 and the side door 7 can be drained smoothly by way of the third flow passage Z.

In the embodiment of the present invention, the vertical weather strip (the pillar-side weather strip 41) is supported at the vehicle-body side pillar portion (see the pillar 24), and the vertical rib 41k which forms the flow passages 41i, 41j by contacting the rear-side openable member (the deck cover 12) is provided at the vertical weather strip (the pillar-side weather strip 41) at the specified position between the seal portion 41d of the vertical weather strip (the pillar-side weather strip 41) which contacts the rear-side openable member (see the deck cover 12) and the seal portion (41e) of the vertical weather strip (the pillar-side weather strip 41) which contacts the side door 7 (specifically, the door window glass 6 of the side door 7) (see FIGS. 1 and 11A-11D). The above-described rear openable member and the above-described third roof member are configured to be the deck cover 12.

According to this structure, since the vertical rib 41k which forms the flow passages 41i, 41j by contacting the rear openable member (the deck cover 12) is provided at the specified position between the two seal portions 41d, 41e, the flow passages 41i, 41j can be created additionally by simply providing the vertical rib 41k, so that the productivity of the vertical weather strip (the pillar-side weather strip 41) can be secured.

In the embodiment of the present invention, the roof-side weather strip 33 is provided to engage with the upper-end recess portion 41c provided at the vertical weather strip (the pillar-side weather strip 41) in the wedge shape, and the lip 33k is provided at the engagement-joining point of the roof-side weather strip 33. Herein, the lip 33 is provided at the specified position which is interposed between another member (see the door window glass 6) and the outer surface of the vertical weather strip (the pillar-side weather strip 41) such that the lip 33k is configured to be pressed against the outer surface of the vertical weather strip (the pillar-side weather strip 41) by the other member (the door window glass 6) (see FIGS. 10A-10D).

According to this structure, since the roof-side weather strip 33 engages with the upper-end recess portion 41c provided at the vertical weather strip (the pillar-side weather strip 41) in the wedge shape, the liquid-tightness of the first flow passage X can be secured in particular. Further, since the lip 33k configured to be pressed against the outer surface of the vertical weather strip (the pillar-side weather strip 41) by the other member (the door window glass 6) is provided at the above-described engagement-joining point, the sealing of the engagement-joining point can be improved.

In correspondence between the present invention and the above-described embodiment, the first roof member of the present invention corresponds to the front roof 8 of the embodiment. Likewise, the second roof member corresponds to the rear roof 9, the third roof member corresponds to the deck cover 12, the vertical weather strip corresponds to the pillar-side weather strip 41, the partition wall corresponds to the seal portions 41d, 41e and the vertical rib 41k, the vehicle-body pillar portion corresponds to the pillar 24, and the rear openable member corresponds to the deck cover 12. However, the present invention should not be limited to the structure of the above-described embodiment. For example, the vertical flow passage 41f may be made to connect to at least one of the first flow passage X and the second flaw passage Y.

What is claimed is:

1. A seal structure of an automotive vehicle with a storing-type roof which comprises openable plural roof members of a first roof member, a second roof member, and a third roof member, comprising:
   a front weather strip provided between the first roof member and the second roof member;
   a rear weather strip provided between the second roof member and the third roof member;
   a roof-side weather strip provided at the second roof member; and
   a vertical weather strip,
   wherein plural partition walls which form plural vertical flow passages are provided at said vertical weather strip, and a first flow passage for distributing water from said front weather strip to said plural vertical flow passages of the vertical weather strip by way of said roof-side weather strip and a second flow passage for distributing water from said rear weather strip to at least one of said plural vertical flow passages of the vertical weather strip are provided.

2. The seal structure of the automotive vehicle with the storing-type roof of claim 1, wherein a third flow passage for draining water coming in a space between said roof-side weather strip and a side door is provided at the roof-side weather strip.

3. The seal structure of the automotive vehicle with the storing-type roof of claim 1, wherein said vertical weather strip is supported at a vehicle-body side pillar portion, and a vertical rib which forms a flow passage by contacting a rear-side openable member is provided at the vertical weather strip at a specified position between a seal portion of the vertical weather strip which contacts said rear-side openable member and another seal portion of the vertical weather strip which contacts a side door.

4. The seal structure of the automotive vehicle with the storing-type roof of claim 2, wherein said vertical weather strip is supported at a vehicle-body side pillar portion, and a vertical rib which forms a flow passage by contacting a rear-side openable member is provided at the vertical weather strip at a specified position between a seal portion of the vertical weather strip which contacts said rear-side openable member and another seal portion of the vertical weather strip which contacts a side door.

5. The seal structure of the automotive vehicle with the storing-type roof of claim 3, wherein said rear-side openable member is said third roof member, which is configured to be a deck cover.

6. The seal structure of the automotive vehicle with the storing-type roof of claim 4, wherein said rear-side openable member is said third roof member, which is configured to be a deck cover.

7. The seal structure of the automotive vehicle with the storing-type roof of claim 1, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

8. The seal structure of the automotive vehicle with the storing-type roof of claim 2, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

9. The seal structure of the automotive vehicle with the storing-type roof of claim 3, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

10. The seal structure of the automotive vehicle with the storing-type roof of claim 4, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

11. The seal structure of the automotive vehicle with the storing-type roof of claim 5, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

12. The seal structure of the automotive vehicle with the storing-type roof of claim 6, wherein said roof-side weather strip is provided to engage with an upper-end recess portion provided at said vertical weather strip in a wedge shape, and a lip is provided at an engagement-joining point of the roof-side weather strip, the lip being provided at a specified position which is interposed between another member and an outer surface of the vertical weather strip such that the lip is configured to be pressed against the outer surface of the vertical weather strip by said other member.

\* \* \* \* \*